United States Patent [19]

Pozo

[11] Patent Number: 5,158,416
[45] Date of Patent: Oct. 27, 1992

[54] APPARATUS FOR HANDLING RAILWAY WHEELS

[75] Inventor: Jaime F. Pozo, Chicago, Ill.

[73] Assignee: AMSTED Industries Incorporated, Chicago, Ill.

[21] Appl. No.: 751,244

[22] Filed: Aug. 29, 1991

[51] Int. Cl.$^5$ ............................................. B60B 30/06
[52] U.S. Cl. ................... 414/427; 294/114; 414/626; 414/786
[58] Field of Search ............... 414/426–429, 414/626, 786; 294/110.1, 110.2, 113, 114

[56] References Cited

U.S. PATENT DOCUMENTS

| | | | |
|---|---|---|---|
| 2,215,844 | 9/1940 | Van Syckle | 294/110.1 |
| 2,259,365 | 10/1941 | De Forest | 414/429 X |
| 2,382,227 | 8/1945 | Hopkins et al. | 294/110.1 |
| 2,743,954 | 5/1956 | Östlund | 294/110.1 X |
| 3,235,106 | 2/1966 | Diehl | 414/429 |
| 3,501,037 | 3/1970 | Donovan | 414/427 |
| 3,830,388 | 8/1974 | Mott | 414/429 |

FOREIGN PATENT DOCUMENTS

| | | | |
|---|---|---|---|
| 3023689 | 1/1982 | Fed. Rep. of Germany | 294/110.1 |
| 901232 | 1/1982 | U.S.S.R. | 284/110.1 |
| 1475883 | 4/1989 | U.S.S.R. | 294/110.1 |

Primary Examiner—David A. Bucci
Attorney, Agent, or Firm—Edward J. Brosius; Florian S. Gregorczyk; Thomas J. Schab

[57] ABSTRACT

A railway wheel lifting device is provided wherein a railway wheel can be readily and positively affixed to a lifting device. Upon such affixing and lifting, the wheel can be moved as necessary with the lifting device. Positive locking mechanisms are provided whereby the rim section of the wheel is held between depending legs of a frame support. When it is desired to release the wheel, an operating cylinder is operatively connected to operating rods which in turn can move cam assemblies out of contact with the wheel to thereby permit the wheel to be released from the lifting device.

14 Claims, 2 Drawing Sheets

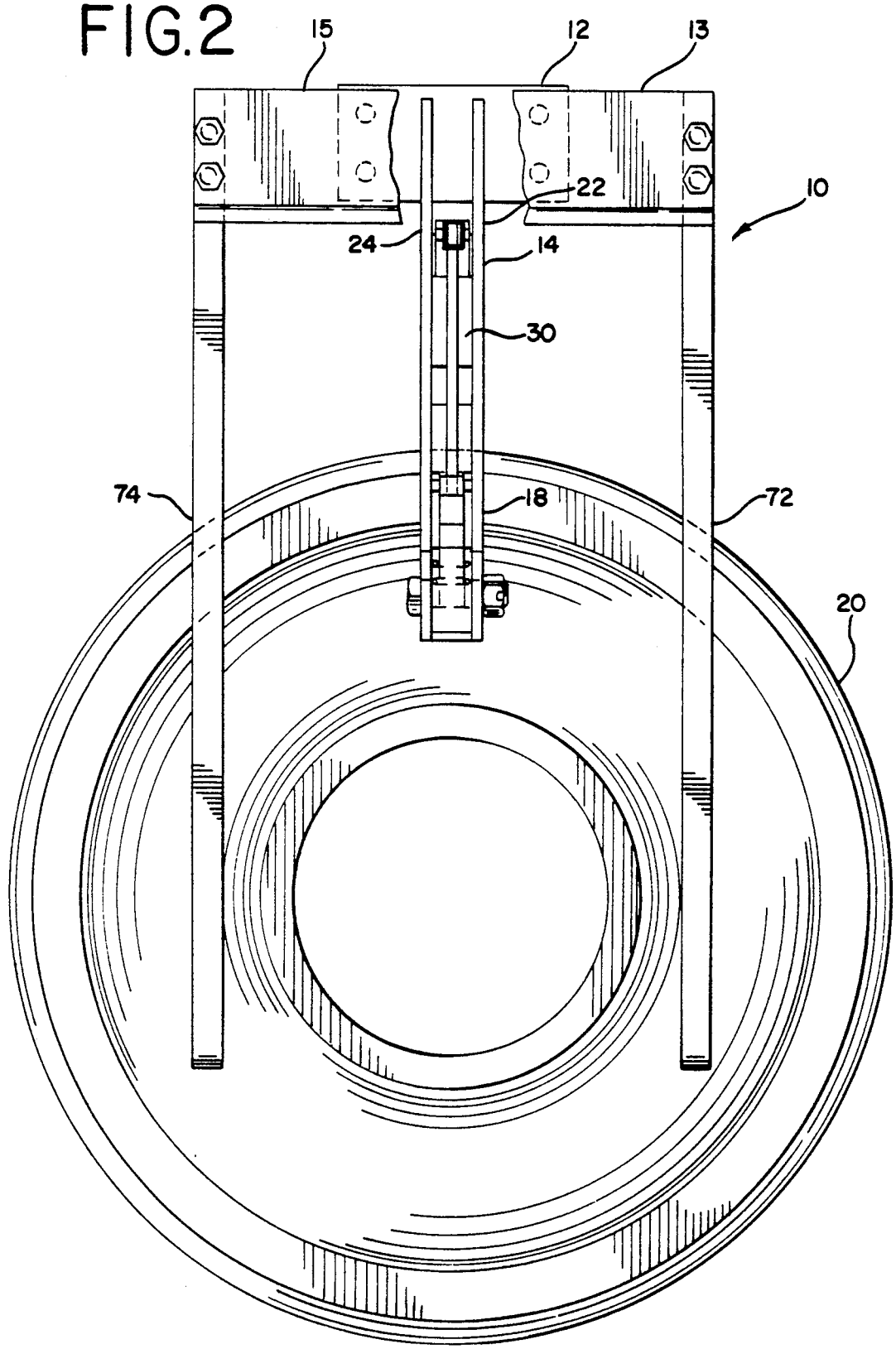

APPARATUS FOR HANDLING RAILWAY WHEELS

BACKGROUND OF THE INVENTION

The present invention relates to a method and an apparatus for handling railway wheels, and more particularly, to a device and method for quickly lifting railway wheels so that they can be moved.

In the manufacture of cast steel railway wheels, it is usual that such railway wheels are moved after casting along roller conveyers and other table means while said wheels are horizontal. However, it is necessary from time to time in the manufacturing operation to move such railway wheels from one location to another. This has proven to be both a time consuming process affecting overall manufacturing efficiency as well as presenting a safety concern. Such railway wheels are quite heavy, commonly weighing about 700 lbs. (320 kg.). The wheels themselves are comprised of a central hub section, a radial plate extending outwardly therefrom and a rim section at the outer circumference thereof. The rim includes an outwardly extending flange which is obviously utilized to keep the wheel on the track.

Various types of tongs, cables and other sling devices have been utilized in the past to lift the railway wheels. These devices are all lacking in desirability for various reasons including time necessary to hook the wheel with the sling as well as instability while the wheel is so affixed.

SUMMARY OF THE INVENTION

It is an object of the present invention to provide an apparatus and method for handling railway wheels that readily receives the railway into a firm and positive support arrangement to permit the wheel to be lifted and moved as desired.

It is a further object of the present invention to provide a method and apparatus for handling railway wheels that can readily and positively release the wheel from the positive receiving arrangement.

The present invention provides a frame arrangement having depending legs adapted to receive a railway wheel therebetween. Cam assemblies are eccentrically mounted to the depending legs and also connected to an operating rod arrangement. The cams are biased to extend into the open receiving area between the depending legs such that a wheel can be forced upwardly into the receiving area pushing said cams temporarily out of the receiving area. The biasing arrangement will return the cams positively back into the receiving area to mechanically lock the wheel into the receiving area and permit it to be moved therewith.

Upon activation of the operating rods, the cams are rotated out of the receiving area to thereby permit the wheel to be removed from the receiving area when it has been moved to the desired location.

BRIEF DESCRIPTION OF THE DRAWINGS

In the drawings,

FIG. 2 is a front view of the same embodiment of the present invention.

DESCRIPTION OF THE PREFERRED EMBODIMENT

Figure 1:
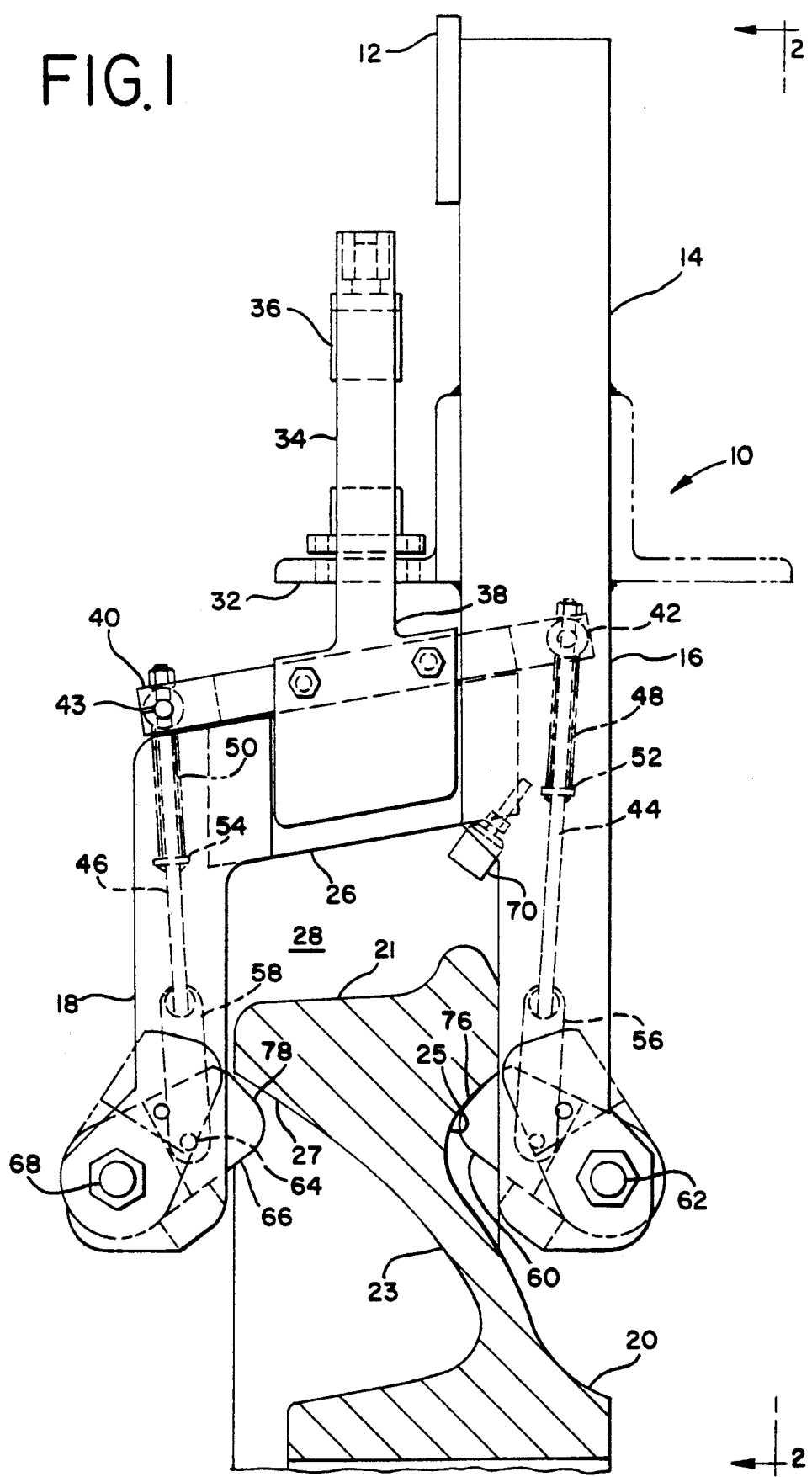
FIG. 1 is a side view in partial cross-section, an embodiment of the present invention.

A railway wheel lifting device in accordance with the present invention is shown generally in FIG. 1 as also seen in FIG. 2, lateral frame 12 is seen to extend in a direction along the width of railway wheel 20. Lateral frame 12 and other structural components of the railway wheel lifting device 10 are typically made of structural steel, although other appropriate alloys may be utilized. Elongated support frame 14 is attached by suitable means such as bolting or welding to lateral support frame 12 and extends downwardly therefrom. Elongated support frame 14 extends downwardly and then splits into first depending leg 16 and second depending 18 which are longitudinally separated to form longitudinal space 28 therebetween. A cross-support-section 26 joins first depending leg 16 and second depending leg 18 at top of each depending leg such that in the side view of FIG. 1, elongated support frame 14, cross-support 26 and depending legs 16 and 18 could be described as a generally chair-shaped structure.

As shown in FIG. 2, elongated support frame 14 is actually comprised of two nearly identical support frame sections 22 and 24. Support frame sections 22 and 24 are laterally spaced from each other to form an operating space 30 therebetween. Support frame section 22 extends downwardly to form depending leg 16 and 18 as seen in FIG. 1. It is understood that support frame section 24 also extends downwardly and has similar depending legs that are not seen in FIG. 1.

Support flange 32 is affixed to a front part of elongated support frame 14 by means such as welding. Support flange 32 includes an opening through which elongated shaft 34 passes. Elongated shaft 34 is in turn operatively connected to operating cylinder 36 which can be actuated to cause the raising and lowering of operating shaft 34.

Elongated shaft 34 includes an end 38 to which spacer bar 40 is affixed by means such as bolting or welding. Spacer bar 40 extends longitudinally in operating space 30 between support frame sections 22 and 24. Spacer bar 40 includes openings near its longitudinal ends through which ends of first operating rod 44 is affixed to opening 42 and second operating rod 46 is affixed to opening 43. First operating rod 44 includes a platform 52 around the circumference thereof to support biasing spring 48. Biasing spring 48 is compressed such that operating rod 44 is under tension. Similar biasing spring 50 acts on platform 54 of second operating rod 46 to bias second operating rod 46.

Shackle 56 is attached to the other end of first operating rod 44. The attachment is by an appropriate pivot pin or equivalent device. The other end of shackle 56 is pivotally attached to cam 60. Cam 60 is also pivotally attached at 62 to by an appropriate pivot pin to near an end of first depending leg 16. It should be pointed out that first operating rod 44, shackle 56 and cam 60 all are located in operating space 30 between support frame sections 22 and 24.

A similar shackle 58 is pivotally connected to the other end of second operating rod 46. In turn, an end of shackle 58 is pivotally connected at 64 to a second cam 66. Second cam 66 is in turn connected by a pivot pin or similar device at 68 to a location near the end of second depending leg 18. Second operating rod 46, shackle 58 and cam 66 are located in the operating space 30 between support frame sections 22 and 24 in second depending leg 18.

The railway wheel is shown at 20 with a section thereof shown in FIG. 1. Railway wheel 20 includes a rim section 21 and a plate section 23. The radially inter portion near rim 21.

Cams 60 and 64 are normally biased by springs 48 and 50 respectively to extend partially into longitudinal space 28 between first depending leg 16 and second depending leg 18. When it is desired to lift railway wheel 20, elongated support frame 14 is lowered along with first depending leg 16 and second depending leg 18 onto railway wheel 20 such that rim section 21 extends into longitudinal space 28. In so extending, rim section 21 temporarily pushes cam 60 about its pivot 62 and cam 66 about its pivot 68. As rim 21 of railway wheel 20 passes by cams 60 and 66, biasing spring 48 pushes cam 60 generally downwardly about its pivot 62 such that an upper section 76 of cam 60 contacts a section an inner rim section 25 of railway wheel 20. Formerly, biasing spring 50 pushes cam 66 generally downwardly about pivot point 68 such that an upper section 78 of cam 68 generally contacts an inner rim section 27 of wheel 20 to keep wheel 20 locked into longitudinal space 28 of railway wheel lifting device 10.

When it is desired to release wheel 20 from wheel lifting device 10, operating cylinder 36 is activated to lift shaft 34. By lifting shaft 34, spacer bar 40 is also lifted which thereby also raises first operating rod 44 and second operating rod 46. In turn, cam 60 is pulled generally upwardly by shackle 56 and such that the 60 which extended into longitudinal space 20 no longer so extends. Similarly, cam 66 is rotated generally upwardly by the upward movement of second operating rod 46 and its associated shackle 58. The portion of cam 66 which extends into longitudinal space 28 no longer so extends, and accordingly, wheel 20 is removed from railway wheel lifting device 10.

Stabilizing bars 72 and 74 extend downwardly from lateral extensions 13 and 15. Stabilizing bars 72 and 74 are utilized to help keep railway wheel 20 from rotating when held by railway lifting device 10.

A sensing device 70 can also be utilized in railway lifting device 10. Sensing device 70 is mounted generally near the intersection of cross-support 26 and first depending leg 16. Such sensing device will, by either induction metal sensing or photoelectric sensing detect the presence of wheel 20 and its rim section within longitudinal space 28. The appropriate control on operating cylinder 36 can be tied to sensing device 70 as appropriate.

What is claimed is:

1. An apparatus for handling railway wheels comprising a lateral frame, an elongated support frame extending downwardly from said lateral frame, said elongated support frame having a first and a second depending leg section, said depending leg sections being separated to form a longitudinal space therebetween, a slide assembly mounted to said elongated support frame in a manner to be vertically moveable relative to said elongated support frame, said slide assembly comprising an elongated shaft and a spacer bar mounted to said elongated shaft, a first and a second operating rod each extending downwardly from opposed ends of said spacer bar, a first cam assembly pivotally mounted near an end of said first depending leg sections and a second cam assembly pivotally mounted near an end of said second depending leg section, an end of said first operating rod connected to said first cam assembly and an end of said second operating rod connected to said second cam assembly, a first biasing means acting on said first operating rod to hold a portion of said first cam assembly projecting into said longitudinal space between said depending leg sections, a second biasing means acting on said second operating rod to hold a portion of said second cam assembly projecting into said longitudinal space between said depending leg sections, such that upon upward movement of said elongated shaft of said slide assembly, said operating rods are moved upwardly to rotate said cam assemblies out of said longitudinal space between said depending leg sections.

2. The apparatus of claim 1 further comprising an operating cylinder connected to said elongated support frame and to said elongated shaft of said slide assembly such that upon contraction of said operating cylinder, said elongated shaft of said slide assembly is raised.

3. The apparatus of claim 1 wherein each of said cam assemblies comprises a cam member essentially mounted on a pin held by one of said depending leg sections of said elongated support frame.

4. The apparatus of claim 3, further comprising a first shackle means connected to the end of said first operating rod and to said cam member of said first cam assembly and a second shackle means connected to the end of said second operating rod and to said cam member of said second cam assembly.

5. The apparatus of claim 1 wherein said elongated support frame comprises two parallel sections separated laterally from each other, with said depending leg sections each comprising a depending portion of said parallel sections and each of said first and second depending leg sections forming an internal lateral space therebetween.

6. The apparatus of claim 5 wherein said first operating rod extends into the internal lateral space between said first depending leg sections and said second operating rod extends into the internal lateral space between said second depending leg sections.

7. The apparatus of claim 1 further comprising a first and a second stabilizing bar that extends downwardly from said lateral frame from a position laterally outwardly from said elongated support frame.

8. The apparatus of claim 2 further comprising a sensing means mounted to said elongated support frame such that a railway wheel received into said longitudinal space between said depending leg sections can be sensed.

9. The apparatus of claim 8 wherein said sensing means provides a control signal to said operating cylinder to enable said elongated shaft of said slide assembly to be raised when it is desired to release the railway wheel.

10. A method of handling railway wheels comprising the steps of providing a lateral frame and an elongated support frame extending downwardly from said lateral frame, providing a first and a second depending leg section of said elongated support frame to form a longitudinal space between said depending leg sections, mounting a slide assembly to said elongated support frame so as to be vertically moveable relative to said elongated support frame, said slide assembly comprising an elongated shaft and a spacer bar mounted to said elongated shaft, and a first and a second operating rod each extending downwardly from opposed ends of said spacer bar, providing a first cam assembly pivotally mounted near an end of said first depending leg section and a second cam assembly pivotally mounted near an end of said second depending leg section, connecting an end of said first operating rod to said first cam assembly and an end of said second operating rod to said second cam assembly, providing a first biasing means to act on said first operating rod to hold a portion of said first cam assembly projecting into said longitudinal space between said depending leg sections, and providing a second biasing means to act on said second operating rod to hold a portion of said second cam assembly projecting into said longitudinal space between said depending leg sections, and moving said elongated shaft of said slide assembly upwardly such that said operating rods are moved upwardly to rotate said cam assemblies out of said longitudinal space between said depending leg sections to thereby release a railway wheel held by said cam assemblies.

11. The method of claim 10 further providing an operating cylinder connected to said elongated shaft of said slide assembly, and contracting said operating cylinder causes the elongated shaft of said slide assembly to be raised.

12. The method of claim 11 further providing each of said cam assemblies with a pin whereby each cam assembly is essentially mounted on one of said depending leg sections.

13. The method of claim 11 wherein upon lowering of said elongated support frame and said depending leg sections, a railway wheel contacts and moves said cam assemblies to allow said railway wheel into said longitudinal space therebetween, and said cam assemblies are biased to project back into said longitudinal space to hold said railway wheel by contacting an inner edge of said railway wheel.

14. The method of claim 13 wherein upon contracting a said operating cylinder, said elongated shaft of said slide assembly is raised along with said operating rods, said cam assemblies rotate out of said longitudinal space between said depending leg sections to release said railway wheel.

* * * * *